(12) United States Patent
Freeman-Powell

(10) Patent No.: US 11,993,208 B2
(45) Date of Patent: May 28, 2024

(54) IMAGE PROCESSING SYSTEM AND METHOD

(71) Applicant: JAGUAR LAND ROVER LIMITED, Coventry (GB)

(72) Inventor: Aaron Freeman-Powell, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 246 days.

(21) Appl. No.: 17/440,511

(22) PCT Filed: Mar. 18, 2020

(86) PCT No.: PCT/EP2020/057426
§ 371 (c)(1),
(2) Date: Sep. 17, 2021

(87) PCT Pub. No.: WO2020/187978
PCT Pub. Date: Sep. 24, 2020

(65) Prior Publication Data
US 2022/0153195 A1  May 19, 2022

(30) Foreign Application Priority Data
Mar. 19, 2019 (GB) .................................. 1903727

(51) Int. Cl.
*B60R 1/00* (2022.01)
*B60R 1/26* (2022.01)
(Continued)

(52) U.S. Cl.
CPC ................ *B60R 1/003* (2013.01); *B60R 1/26* (2022.01); *G06T 7/11* (2017.01); *B60R 2300/30* (2013.01);
(Continued)

(58) Field of Classification Search
CPC ..... B60R 1/003; B60R 1/26; B60R 2300/303; B60R 2300/8066; B60R 2300/30;
(Continued)

(56) References Cited

U.S. PATENT DOCUMENTS 10,160,383 B2 * 12/2018 Onuma .................... G06T 7/194
10,549,694 B2 *  2/2020 Murad ...................... B60R 1/12
(Continued)

FOREIGN PATENT DOCUMENTS

CN         106101522 A      11/2016
CN         106573577 A       4/2017
(Continued)

OTHER PUBLICATIONS

International Search Report corresponding to International Application No. PCT/EP2020/057426, dated May 4, 2020, 4 pages.
(Continued)

*Primary Examiner* — Brian P Yenke
(74) *Attorney, Agent, or Firm* — Reising Ethington P.C.

(57) ABSTRACT

Aspects of the present invention relate to an image processing system for processing image data received from first and second imaging devices provided on a towing vehicle and a towed vehicle connected by an articulated coupling. The image processing system includes one or more controller. The image processing system has an input configured to receive first image data from a first imaging device disposed on the towed vehicle and second image data from a second imaging device disposed on the towing vehicle. The first imaging device has a first field of view and the first image data represents a first scene behind the towed vehicle. The second imaging device has a second field of view and the second image data represents a second scene behind the towing vehicle. The image processing system includes a processor configured to determine an obscuration region in
(Continued)

the second field of view which is obscured by the towed vehicle. An area of interest is determined in the first field of view in dependence on the determined obscuration region. The processor is configured to select a subsection of the first image data representing at least a portion of the determined area of interest. The present invention also relates to a method of processing image data; computer software and a non-transitory, computer-readable storage medium.

15 Claims, 10 Drawing Sheets

(51) Int. Cl.
*G06T 7/11* (2017.01)
*G06T 7/174* (2017.01)
(52) U.S. Cl.
CPC .............. *B60R 2300/802* (2013.01); *G06T 2207/30252* (2013.01)
(58) Field of Classification Search
CPC ... B60R 2300/802; G06T 7/174; G06T 7/194; G06T 7/11
See application file for complete search history.

(56) References Cited

U.S. PATENT DOCUMENTS

| | | | |
|---|---|---|---|
| 10,589,680 B2* | 3/2020 | Ward | B60R 1/002 |
| 10,701,300 B2* | 6/2020 | Greenwood | H04N 7/181 |
| 11,220,216 B2* | 1/2022 | Murad | B60R 1/12 |
| 11,263,758 B2* | 3/2022 | Freeman-Powell | G06T 11/60 |
| 2014/0085472 A1* | 3/2014 | Lu | B60R 1/00 348/148 |
| 2015/0296140 A1* | 10/2015 | Kim | H04N 23/698 348/38 |
| 2016/0366336 A1 | 12/2016 | Kuehnle et al. | |
| 2017/0280091 A1* | 9/2017 | Greenwood | H04N 5/265 |
| 2017/0341583 A1 | 11/2017 | Zhang et al. | |
| 2018/0101736 A1 | 4/2018 | Han et al. | |
| 2018/0186290 A1 | 7/2018 | Ward et al. | |
| 2018/0213162 A1 | 7/2018 | Tsutsumitake | |
| 2019/0241126 A1 | 8/2019 | Murad et al. | |
| 2021/0192745 A1* | 6/2021 | Kahlbaum | G06V 10/44 |
| 2022/0118910 A1* | 4/2022 | Freeman-Powell | H04N 23/698 |
| 2022/0141383 A1* | 5/2022 | Freeman-Powell | H04N 7/181 348/148 |

FOREIGN PATENT DOCUMENTS

| | | |
|---|---|---|
| CN | 107031508 A | 8/2017 |
| DE | 102017111530 A1 | 11/2017 |
| EP | 3342645 A1 | 7/2018 |
| GB | 2529408 A | 2/2016 |
| GB | 2530649 A | 3/2016 |
| GB | 2541906 A | 3/2017 |
| GB | 2548598 A | 9/2017 |
| GB | 2582262 A | 9/2020 |
| WO | 2014130049 A1 | 8/2014 |
| WO | 2016205080 A1 | 12/2016 |

OTHER PUBLICATIONS

Written Opinion corresponding to International Application No. PCT/EP2020/057426, dated May 4, 2020, 6 pages.
Combined Search and Examination Report corresponding to Great Britain Application No. GB1903727.4, dated Sep. 9, 8 pages.
Great Britain Office Action corresponding to Application No. GB1903727.4, dated Jul. 9, 2021, 3 pages.
European Office Action corresponding to application 20 712 339.9, dated Oct. 5, 2023, 5 pages.
Chinese Office Action corresponding to application 202080023296. 2, dated Oct. 28, 2023, 29 pages.

* cited by examiner

IMAGE PROCESSING SYSTEM AND METHOD

TECHNICAL FIELD

The present disclosure relates to an image processing system and method. Aspects of the invention relate to an image processing system, a vehicle, an image processing method, computer software, and a non-transitory, computer-readable storage medium.

BACKGROUND

It is known from UK patent application number GB2529408 to provide a system and apparatus for generating a composite image of a region behind a trailer coupled to a towing vehicle. A controller is provided to generate a composite image by combining a first image captured by a camera provided on the towing vehicle and a second image captured by a camera provided on the trailer. The resulting composite image may include a semi-transparent representation of the trailer to aid assessment of the relative position of other vehicles and objects. It is an aim of the present invention to provide improvements over this system and apparatus.

SUMMARY OF THE INVENTION

Aspects and embodiments of the invention provide an image processing system, a vehicle, an image processing method, computer software, and a non-transitory, computer-readable storage medium as claimed in the appended claims.

According to an aspect of the present invention there is provided an image processing system for processing image data received from first and second imaging devices provided on a towing vehicle and a towed vehicle, the towing vehicle and the towed vehicle being connected to each other by an articulated coupling, the image processing system comprising one or more controller, the image processing system comprising:
  an input configured to receive:
    first image data from a first imaging device disposed on the towed vehicle and having a first field of view, the first image data representing a first scene behind the towed vehicle;
    second image data from a second imaging device disposed on the towing vehicle and having a second field of view, the second image data representing a second scene behind the towing vehicle;
  a processor configured to:
    determine an obscuration region in the second field of view which is obscured by the towed vehicle;
    determine an area of interest in the first field of view in dependence on the determined obscuration region; and
    select a subsection of the first image data representing at least a portion of the determined area of interest.

The image processing system determines the area of interest with reference to the determined obscuration region. There may be an overlap between the first and second fields of view. The extent of this overlap may depend on the relative orientation of the towed vehicle and the towing vehicle. The area of interest may be determined to reduce or prevent the display of a part (or parts) of the first field of view which are also included in the second field of view. At least in certain embodiments, the determined area of interest represents a portion of the first field of view which is obscured or concealed from view (by the towed vehicle) within the second field of view. The subsection of the first image data is selected from within the determined area of interest.

The area of interest may be selected in dependence on a size and/or a location of the obscuration region. The area of interest may be selected in dependence on a width of the obscuration region (i.e. a transverse dimension of the obscuration region). The area of interest may be selected in dependence on a height of the obscuration region (i.e. a vertical dimension of the obscuration region).

The obscuration region may be modelled with reference to an origin or reference point. The obscuration region may be modelled in two dimensions or three dimensions. The processor may be configured to model the obscuration region in a reference plane, for example a horizontal plane. The model may represent the angular projection of the obscuration region, for example by determining angular coordinates of the limits or boundaries of the obscuration region.

The image processing system may comprise an output configured to output the selected subsection of the first image data. The selected subsection may be output for display independently, for example in a dedicated display window or on a dedicated display. Alternatively, the selected subsection of the first image data may be used to generate a composite image. The composite image may be output to a display.

Determining the area of interest identifying a region of the first field of view which is contained within the obscuration region. At least in certain embodiments, the determined area of interest may be contained entirely within the obscuration region. The selected subsection of the first image data may relate exclusively to a region of the first field of view which is obscured from view in the second field of view.

The processor may be configured to determine an angular extent of the obscuration region, for example in relation to a predefined origin. The obscuration region may have at least one lateral boundary. The processor may be configured to determine the area of interest in dependence on the or each obscuration region lateral boundary. The area of interest may be located entirely within the lateral boundaries of the obscuration region.

The processor may be configured to identify one or more lateral boundary of the area of interest and/or one or more lateral boundary of the obscuration region.

The processor may be configured to determine the area of interest such that the or each area of interest lateral boundary extends substantially parallel to or is substantially coincident with a corresponding one of the at least one obscuration region lateral boundary. Alternatively, the processor may be configured to determine the area of interest such that the or each area of interest lateral boundary converges towards a corresponding one of the at least one obscuration region lateral boundary at a predetermined distance. The distance may, for example, be defined with reference to a reference point, such as an origin. The distance may be infinity.

In certain embodiments, an internal angle of the area of interest may be scaled, for example in dependence on a reference speed of the towing vehicle. In this implementation, the lateral boundaries of the field of view and the area of interest may not be substantially parallel to each other. The area of interest may be determined such that the centrelines of the area of interest and the obscuration region are substantially parallel to each other, even if the lateral boundaries are not parallel.

The processor may be configured to determine an angular coordinate of the or each lateral boundary of the area of interest and/or the obscuration region. The processor may be configured to determine the area of interest such that each area of interest angular coordinate(s) is substantially equal to a corresponding boundary region angular coordinate(s). The area or interest angular coordinate(s) may be defined with respect to a first (polar) axis. The first axis may, for example, be a longitudinal axis of the towed vehicle. The obscuration region angular coordinate(s) may be defined with respect to a second (polar) axis. The second axis may, for example, be a longitudinal axis of the towing vehicle.

The processor may be configured to determine an internal angle of the obscuration region. The processor may determine the area of interest such that an internal angle of the area of interest is at least substantially equal to the obscuration region internal angle.

The processor may be configured to identify a centreline of the obscuration region and/or the area of interest. The processor may be configured to determine the area of interest such that the area of interest centreline is substantially parallel to the obscuration region centreline. The area of interest centreline and the obscuration region centreline are parallel to and offset from each other when the articulation angle is non-zero.

The input may be configured to receive an articulation angle signal indicating an articulation angle between the towed vehicle and the towing vehicle. The processor may be configured to determine the obscuration region in dependence on the articulation angle.

The processor may be configured to access a vehicle data file comprising one or more of the following: a trailer width; a trailer length; a coupling offset; a tow coupling offset. The processor may determine the obscuration region in dependence on the vehicle data file. The processor may, for example, use an articulation angle and one or more dimensions stored in the vehicle data file to determine the obscuration region.

The input may be configured to receive an articulation angle indicating a current angular orientation of the towed vehicle relative to the towing vehicle; the processor being configured to determine the obscuration region in dependence on the articulation angle.

The articulation angle may be measured, for example using a rotational sensor disposed on the articulated coupling. Alternatively, or in addition, can process the second image data to determine the articulation angle. A target may be provided on the towed vehicle to facilitate identification. The target may comprise one or more graphical elements and the processor may determine the articulation angle by redetermining the relative position and/or shape of said one or more graphical elements. Alternatively, or in addition, the second image data may be analysed to determine one or more features of the towed vehicle to determine the articulation angle. For example, the one or more features of the towed vehicle may comprise a coupling member or a coupling frame (such as an A-frame). The processor may be configured to analyse the second image data to determine the articulation angle. Alternatively, a separate processor may perform the analysis.

According to an aspect of the present invention there is provided an image processing system for a towing vehicle coupled to a towed vehicle by an articulated coupling, the image processing system comprising one or more controller, the image processing system comprising:

an input configured to receive:
first image data from a second imaging device associated with the composite image generation system;
second image data from a first imaging device associated with the composite image generation system;
trailer information relating to one or more characteristics of the trailer of the vehicle-trailer combination;
a processor configured to:
determine an obscuration region of the second imaging device, wherein the obscuration region is a region of the field of view of the second imaging device that comprises the trailer, in dependence on the trailer information;
selectively combine the first image data and the second data image data to generate composite image data; and
an output configured to:
output the composite image data to a further vehicle system.

The processor may be configured to process the second image data to determine at least a portion of an outline of the towed vehicle within the first scene to determine the obscuration region.

The processor may be configured to determine the area of interest in dependence on the size and/or position of the obscuration region.

According to a further aspect of the present invention there is provided a vehicle comprising an image processing system as described herein.

According to a further aspect of the present invention there is provided an image processing method for a towing vehicle coupled to a towed vehicle by an articulated coupling, the image processing method comprising:
receiving first image data from a first imaging device disposed on the towed vehicle and having a first field of view, the first image data representing a first scene behind the towed vehicle;
receiving second image data from a second imaging device disposed on the towing vehicle and having a second field of view, the second image data representing a second scene behind the towing vehicle;
determining an obscuration region in the second field of view which is obscured by the towed vehicle;
determining an area of interest in the first field of view in dependence on the determined obscuration region; and
selecting a subsection of the first image data representing at least a portion of the determined area of interest.

The area of interest may be contained within the obscuration region. At least in certain embodiments, the area of interest may be contained entirely within the obscuration region.

The method may comprise identifying one or more lateral boundary of the area of interest and/or one or more lateral boundary of the obscuration region.

The method may comprise determining the area of interest such that the or each area of interest lateral boundary extends substantially parallel to or is substantially coincident with a corresponding one of the at least one obscuration region lateral boundary.

The method may comprise determining the area of interest such that the or each area of interest lateral boundary converges towards a corresponding one of the at least one obscuration region lateral boundary at a predetermined location.

The method may comprise determining an internal angle of the obscuration region. The method may comprise determining the area of interest such that an internal angle of the area of interest is at least substantially equal to the obscuration region internal angle.

The method may comprise identifying a centreline of the obscuration region. The method may comprise determining the area of interest such that a centreline of the area of interest is substantially parallel to the obscuration region centreline. The area of interest centreline and the obscuration region centreline may be parallel to each other and may be offset from each other when the articulation angle is non-zero. The area of interest centreline and the obscuration region centreline may be coincident with each other when the articulation angle is zero.

The method may comprise determining an articulation angle of the towed vehicle relative to the towing vehicle. The obscuration region may be determined in dependence on the articulation angle.

The method may comprise processing the second image data to determine at least a portion of an outline of the towed vehicle within the first scene to determine the obscuration region.

According to a further aspect of the present invention there is provided computer software that, when executed, is arranged to perform a method described herein.

According to a further aspect of the present invention there is provided a non-transitory, computer-readable storage medium storing instructions thereon that, when executed by one or more electronic processors, causes the one or more electronic processors to carry out the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the second to change any originally filed claim or file any new claim accordingly, including the second to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

An image processing system 1 in accordance with an embodiment of the present invention will now be described with reference to the accompanying figures. The image processing system 1 in the present embodiment is configured to combine at least a portion of a towed vehicle image IMG1 with at least a portion of a towing vehicle image IMG2 to form a composite image IMG3.

Figure 1:
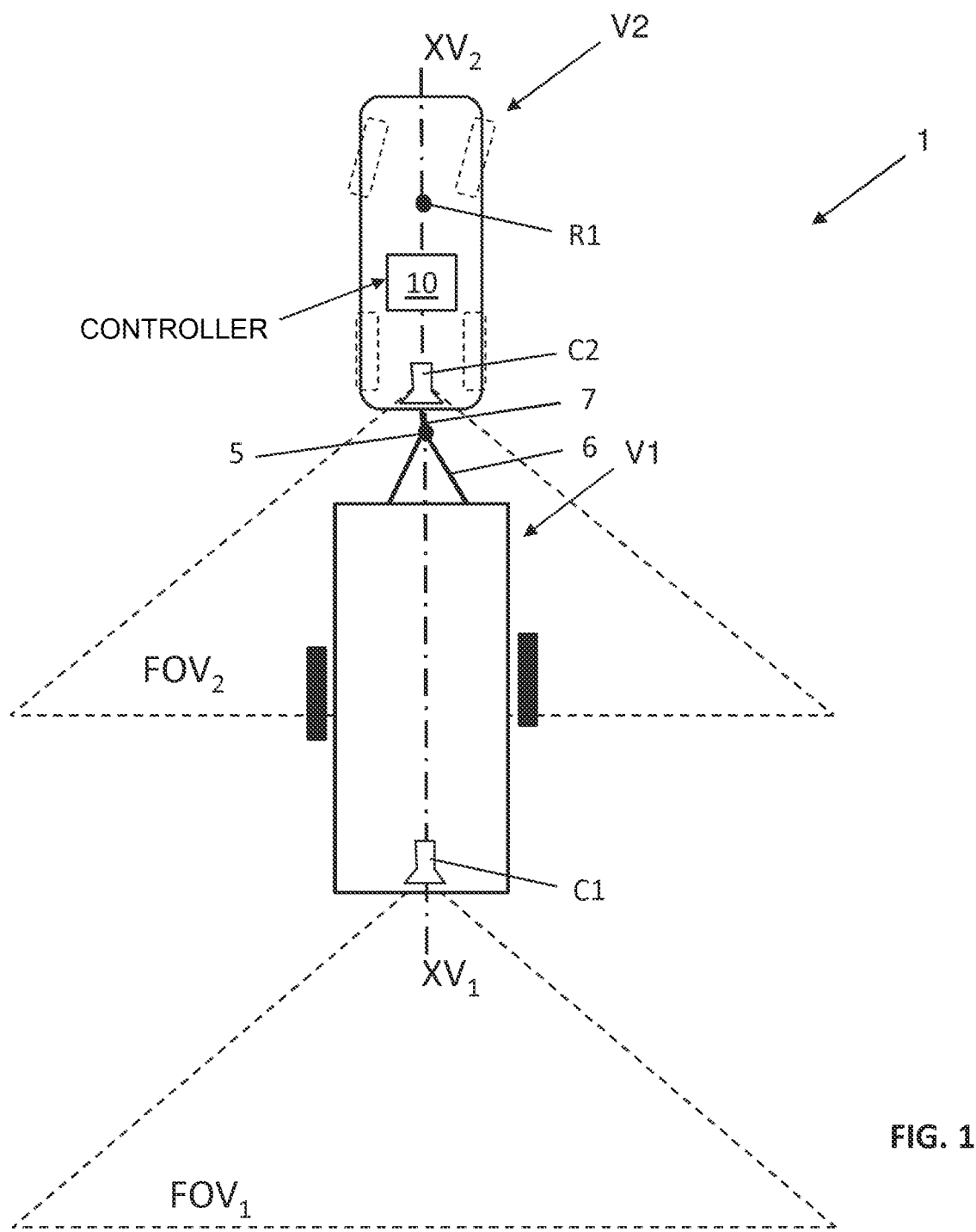
FIG. 1 shows a schematic representation of an image processing system according to an embodiment of the present invention provided in a towing vehicle and a towed vehicle.
Figure 2:
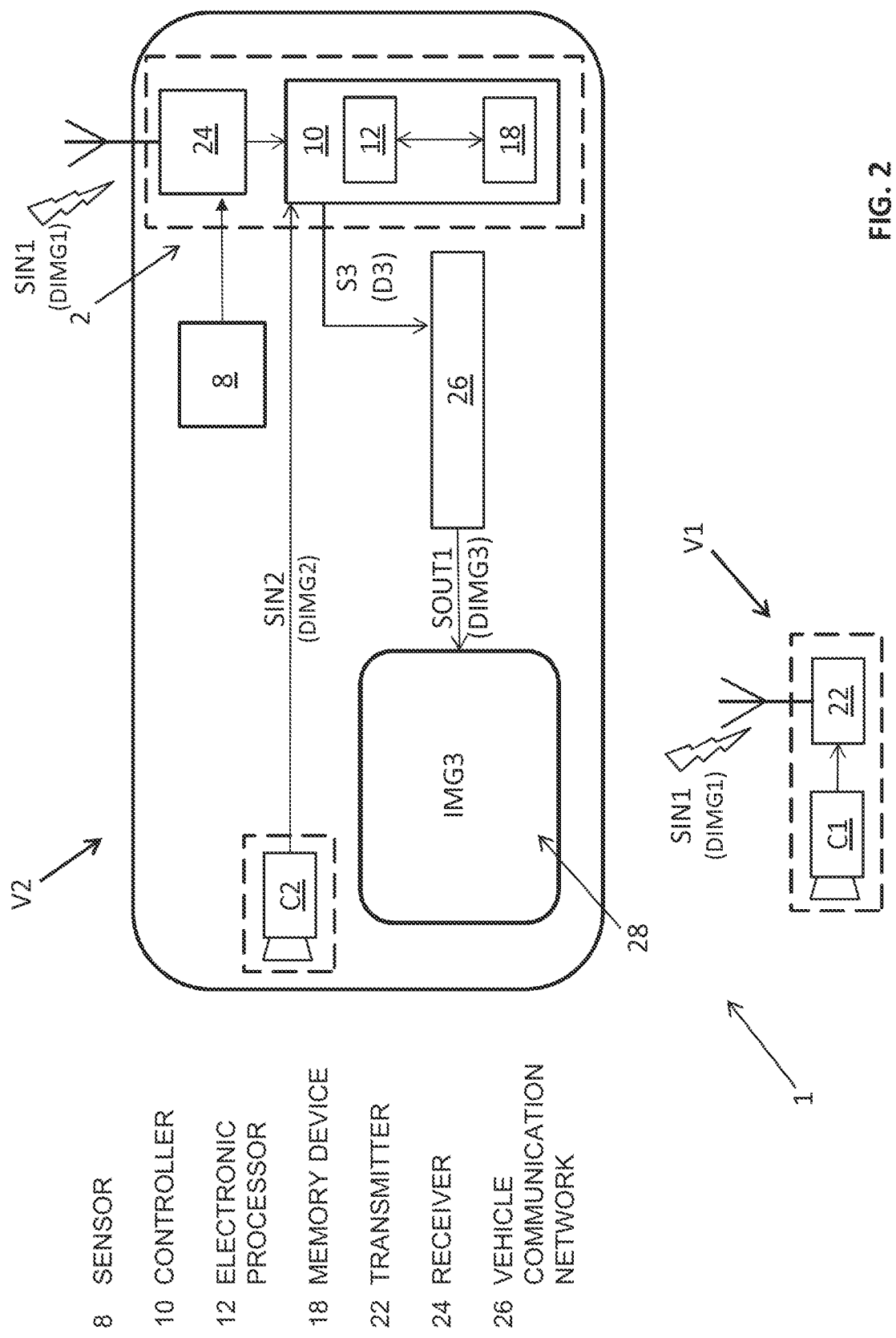
FIG. 2 shows a schematic representation of the towing vehicle incorporating a controller for implementing the image processing system shown in FIG. 1.

The image processing system 1 is suitable for use in a towing vehicle V2 which is coupled to a towed vehicle V1. In the present embodiment, the towing vehicle V2 and the towed vehicle V1 are connected to each other by an articulated coupling 5. The towed vehicle V1 comprises a coupling frame 6 which connects to a tow ball 7 mounted on the towing vehicle V2 to form the articulated coupling 5. The coupling frame 6 in the present embodiment comprises an A-frame. Other configurations of the coupling frame 6 are contemplated. A schematic representation of the towing vehicle V2 and the towed vehicle V1 is shown in FIG. 1. The towing vehicle V2 in the present embodiment is an automobile. Other types of towing vehicle V2 are contemplated, such as a utility vehicle, a sports utility vehicle, a tractor, a truck etc. The towed vehicle V1 in the present embodiment is a trailer. The towed vehicle V1 has a first longitudinal axis XV1; and the towing vehicle V2 has a second longitudinal axis XV2. A schematic representation of the towing vehicle V2 is shown in FIG. 2.

The articulated coupling 5 enables the towing vehicle V2 and the towed vehicle V1 to pivot relative to each other. As a result, the first longitudinal axis XV1 and the second longitudinal axis XV2 may be inclined at an articulation angle θ relative to each other. The pivoting movement is predominantly (but not exclusively) in a horizontal plane which is in the plane of the drawing sheet in FIG. 1. In the present embodiment an articulation sensor 8 is provided for measuring the articulation angle θ. The articulation sensor 8 may, for example, comprise a rotary optical wheel. The articulation sensor 8 outputs an articulation angle signal SART comprising the articulation angle θ. The articulation angle θ is measured with respect to the second longitudinal axis XV2 of the towing vehicle V2. The articulation angle θ is typically less than 90° (i.e. −90°<θ<90°). By way of example, the towed vehicle V1 and the towing vehicle V2 are shown in a first articulated configuration in FIG. 3. In the present embodiment, the articulation angle θ is a positive variable (+ve) when the towed vehicle V1 is rotated in a clockwise direction relative to the towing vehicle V2 (when viewed in a plan elevation from above); and the articulation angle θ is a negative variable (−ve) when the towed vehicle V1 is rotated in an anticlockwise direction relative to the towing vehicle V2 (when viewed in a plan elevation from above). Other techniques may be employed to determine the articulation angle θ.

Figure 4B:
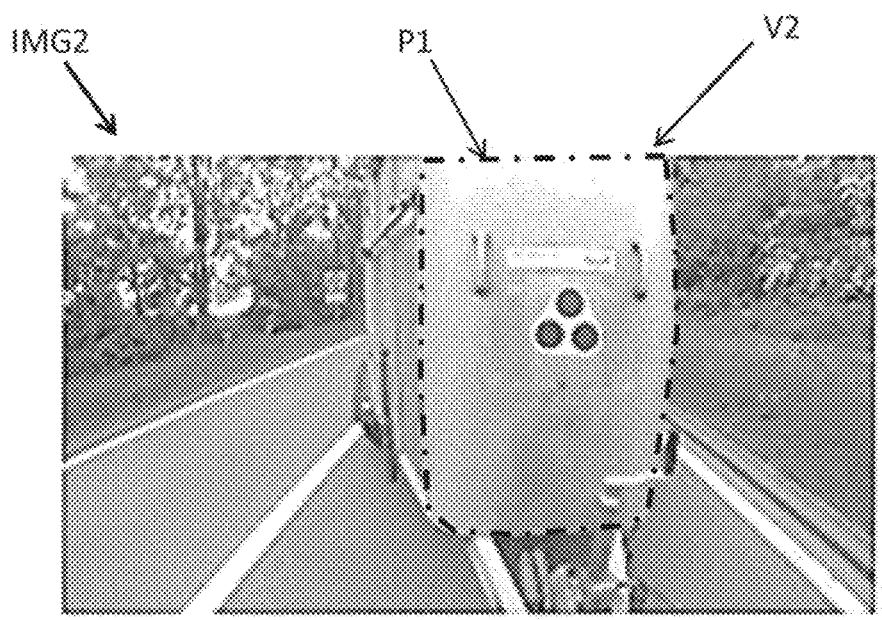
FIG. 4B shows a towing vehicle image captured by an imaging device disposed in the towing vehicle.
Figure 4A:
FIG. 4A shows a towed vehicle image captured by an imaging device disposed in the towed vehicle.

A first imaging device C1 is disposed on the towed vehicle V1 and oriented in a rear-facing direction. The first imaging device C1 is mounted centrally at the rear of the towed vehicle V1, for example above a rear license plate (not shown). The first imaging device C1 comprises a towed vehicle camera C1. The towed vehicle camera C1 has an optical axis substantially parallel to the first longitudinal axis XV1. The towed vehicle camera C1 has a first frustum comprising a first field of view FOV1 which encompasses a region to the rear of the towed vehicle V1. In use, the towed vehicle camera C1 generates towed vehicle image data DIMG1 corresponding to a towed vehicle image IMG1. The towed vehicle image IMG1 comprises a rear-facing scene from the towed vehicle V1 captured by the towed vehicle camera C1. The towed vehicle image IMG1 may, for example, include an image of a section of road behind the towed vehicle V1. The towed vehicle image IMG1 may include one or more objects of interest O-n. The objects of interest O-n may, for example, comprise one or more other vehicles travelling behind the towed vehicle V1 and/or offset laterally from the towed vehicle V1. The towed vehicle camera C1 outputs a first signal SIN1 comprising said towed vehicle image data DIMG1 corresponding to the towed vehicle image IMG1. A towed vehicle image IMG1 is shown in FIG. 4A by way of example.

A second imaging device C2 is disposed on the towing vehicle V2 and oriented in a rear-facing direction. The second imaging device C2 is mounted centrally at the rear of the towing vehicle V2, for example above a rear license plate (not shown). The second imaging device C2 comprises a towing vehicle camera C2. The towing vehicle camera C2 has an optical axis substantially parallel to the second longitudinal axis XV2. The towing vehicle camera C2 has a second frustum comprising a second field of view FOV2 which encompasses a region to the rear of the towing vehicle V2. In use, the towing vehicle camera C2 generates towing vehicle image data DIMG2 corresponding to a towing vehicle image IMG2. The towing vehicle image IMG2 comprises a rear-facing scene from the towing vehicle V2 captured by the towing vehicle camera C2. The towing vehicle image IMG2 may, for example, include at least a portion of a front of the towed vehicle V1 as well as some of the environment around the towed vehicle V1, for example to the sides and/or above and/or below the towed vehicle V1. The towing vehicle camera C2 outputs a second signal SIN2 comprising said towing vehicle image data DIMG2 corresponding to the towing vehicle image IMG2. A towing vehicle image IMG2 is shown in FIG. 4B by way of example. As shown in FIG. 4B, the towed vehicle V1 is visible in the towing vehicle image IMG2 and partially obscures the second field of view FOV2.

The towed vehicle camera C1 and the towing vehicle camera C2 are digital video cameras. The towed vehicle camera C1 is operable to capture a plurality of towed vehicle image frames per second. The towing vehicle camera C2 is operable to capture a plurality of towing vehicle image frames per second. The towed vehicle camera C1 and the towing vehicle camera C2 each have a wide-angle lens with an angle of view of approximately 180°. The angle of view may be less than or greater than 180°. The towed vehicle camera C1 and/or the towing vehicle camera C2 may each be in the form of a mono camera or a stereo camera. The towed vehicle camera C1 can function as a reversing camera to provide a parking aid when the towed vehicle V1 is coupled to the towing vehicle V2. The towing vehicle camera C2 can function as a reversing camera to provide a parking aid when the towed vehicle V1 is not coupled to the towing vehicle V2. The towed vehicle camera C1 and the towing vehicle camera C2 are arranged at approximately the same vertical height above ground level. In alternate arrangements, the towing vehicle camera C2 and the towed vehicle camera C1 may be offset from each other in a vertical direction and/or a transverse direction. A correction may be applied to allow for any vertical offset between the towed vehicle camera C1 and the towing vehicle camera C2. Alternatively, or in addition, a correction may be applied to correct for an angular offset between the towed vehicle camera C1 and the towing vehicle camera C2.

The image processing system 1 comprises one or more controller 10. The controller 10 is in communication with the first imaging device C1 and the second imaging device C2. The image processing system 1 is configured to receive the towed vehicle image data DIMG1 from the first imaging device C1 and the towing vehicle image data DIMG2 from the second imaging device C2. The controller 10 may be configured to synchronise the first and towing vehicle image data DIMG1, DIMG2, for example with reference to time stamp data applied to each image frame. The controller 10 composites at least a part of the towed vehicle image data DIMG1 and at least a part of the towing vehicle image data DIMG2 to generate composite image data DIMG3 representing the composite image IMG3. An output signal SOUT1 comprising the composite image data DIMG3 is output to display the composite image IMG3.

In the present embodiment, the controller 10 is disposed in the towing vehicle V2. In a variant, the controller 10 could be provided in the towed vehicle V1, or the processing could be performed by separate controllers 10 provided on the towed vehicle V1 and/or the towing vehicle V2. It is to be understood that the or each controller 10 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 10 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 10 to implement the control techniques described herein (including some or all of the functionality required for the method described herein). The set of instructions could be embedded in said one or more electronic processors of the controller 10; or alternatively, the set of instructions could be provided as software to be executed in the controller 10. A first controller or control unit may be implemented in software run on one or more processors. One or more other controllers or control units may be implemented in software run on one or more processors, optionally the same one or more processors as the first controller or control unit. Other arrangements are also useful.

Figure 5:
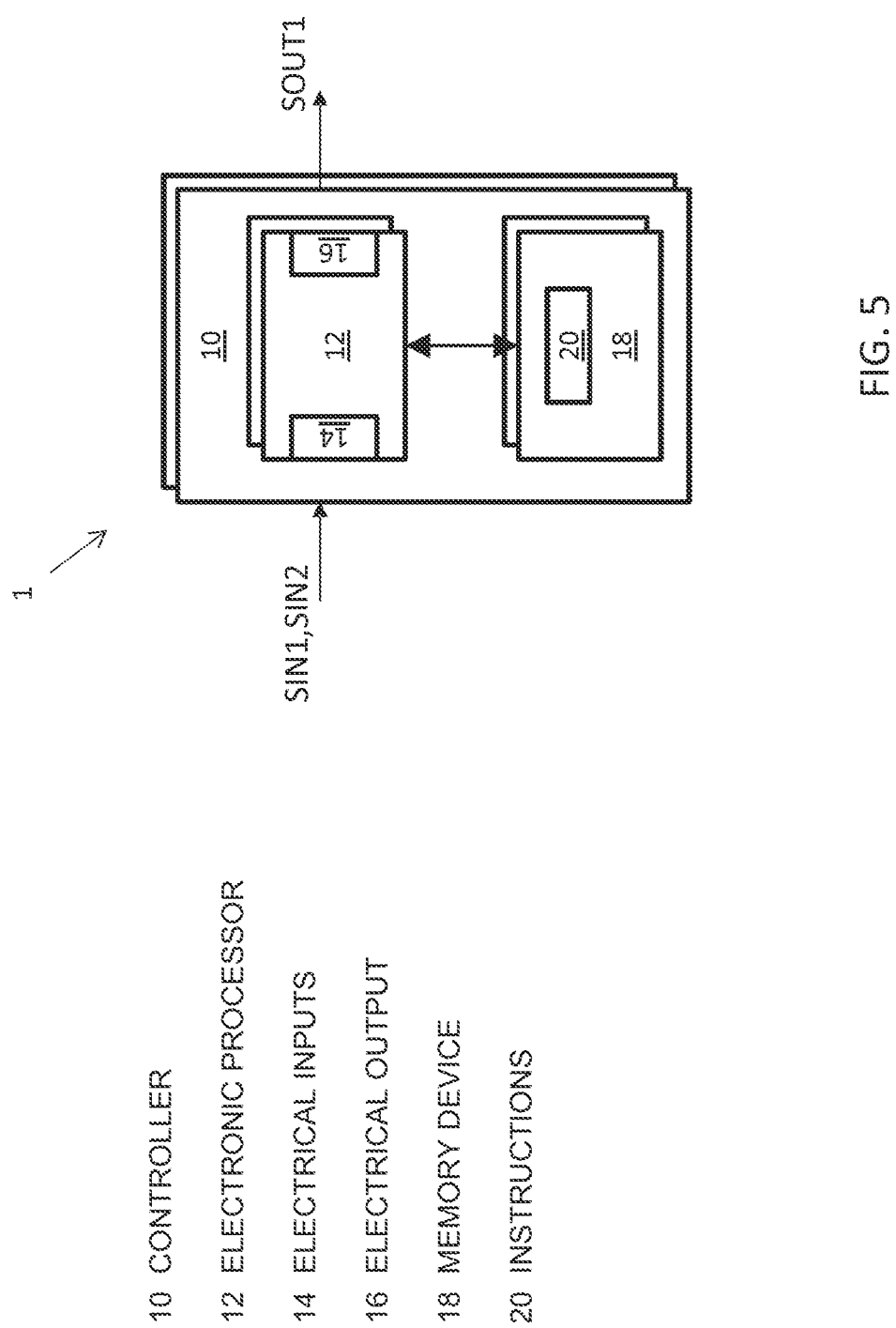
FIG. 5 shows a schematic representation of the controller of the image processing system in accordance with an embodiment of the present invention.

As illustrated in FIG. 5, the or each controller 10 comprises at least one electronic processor 12 having one or more electrical input(s) 14 for receiving one or more input signals from the towed vehicle camera C1 and the towing vehicle camera C2; and one or more electrical output(s) 16 for outputting the output signal SOUT1. The or each controller 10 further comprises at least one memory device 18 electrically coupled to the at least one electronic processor 12 and having instructions 20 stored therein. The at least one electronic processor 12 is configured to access the at least one memory device 18 and execute the instructions 20 thereon so as to perform the method(s) described herein.

The, or each, electronic processor 12 may comprise any suitable electronic processor (e.g., a microprocessor, a microcontroller, an ASIC, etc.) that is configured to execute electronic instructions. The, or each, electronic memory device 18 may comprise any suitable memory device and may store a variety of data, information, threshold value(s), lookup tables or other data structures, and/or instructions therein or thereon. In an embodiment, the memory device 18 has information and instructions for software, firmware, programs, algorithms, scripts, applications, etc. stored therein or thereon that may govern all or part of the methodology described herein. The processor, or each, electronic processor 12 may access the memory device 18 and execute and/or use that or those instructions and information to carry out or perform some or all of the functionality and methodology describe herein.

The at least one memory device 18 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

The first signal SIN1 comprising the towed vehicle image data DIMG1 is input to the controller 10 via the one or more input(s) 14. The connection between the controller 10 and the towed vehicle camera C1 could be a wired connection (for example comprising an electrical connection between the towed vehicle V1 and the towing vehicle V2). In the present embodiment, however, a wireless connection is established between the controller 10 and the towed vehicle camera C1. The towed vehicle camera C1 is connected to a transmitter 22 configured to transmit the towed vehicle image data DIMG1 as a radio frequency (RF) first signal SIN1 to a receiver 24 provided in the towing vehicle V2. The receiver 24 is connected to the one or more input(s) 14 of the controller 10. The second signal SIN2 comprising the towing vehicle image data DIMG2 is input to the controller 10 via the one or more input(s) 14. The connection between the controller 10 and the towing vehicle camera C2 is a wired connection. For example, the towing vehicle camera C2 may be connected to the controller 10 over a vehicle communication network 26, such as a CAN bus. In use, the towed vehicle image data DIMG1 and the towing vehicle image data DIMG2 is input to the controller 10. The towing vehicle V2 comprises a display screen 28 (shown in FIG. 2) on which the towed vehicle image IMG1, the towing vehicle image IMG2 (received from the towed vehicle camera C1 and the towing vehicle camera C2 respectively) and the composite image IMG3 can be selectively displayed.

Figure 6A:
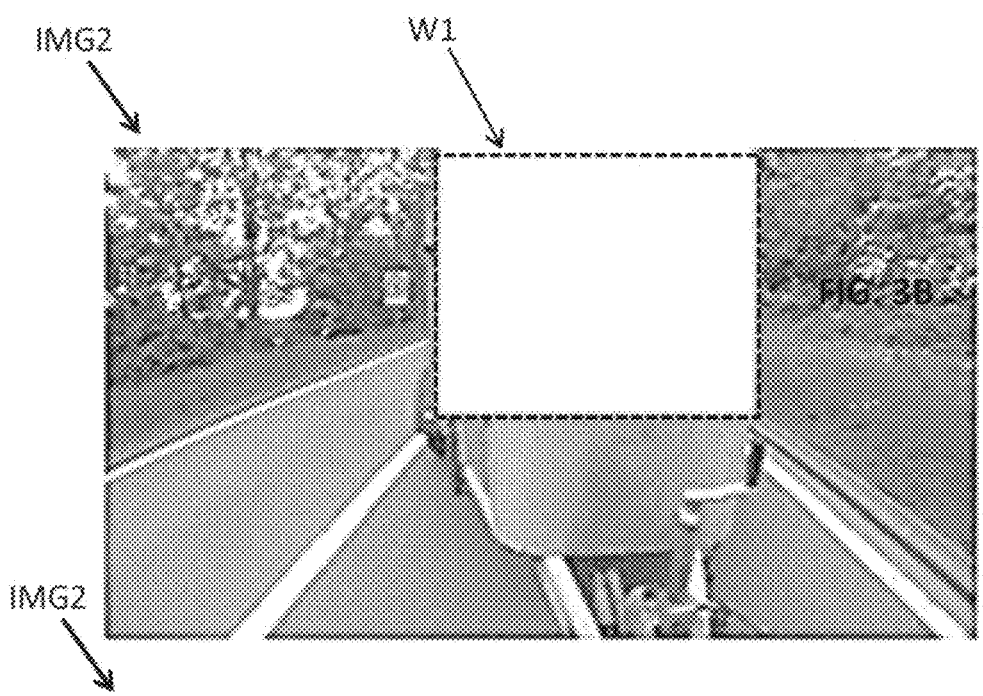
FIG. 6A shows a towed vehicle image modified to include a window coincident with a portion of a front face of the towed vehicle.
Figure 6B:
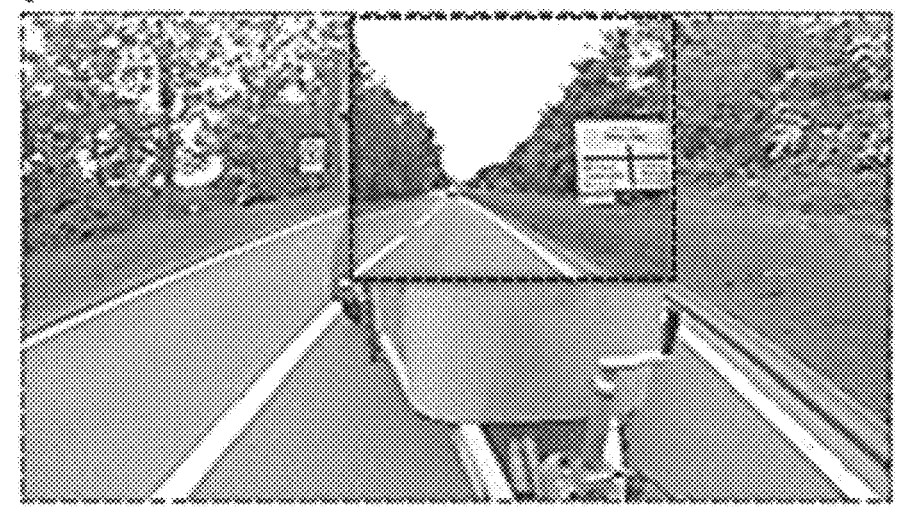
FIG. 6B shows a composite image composed of the modified towed vehicle image shown in FIG. 4A with a portion of the towed vehicle image shown in FIG. 4B.

The controller 10 is configured to combine at least a portion of the towed vehicle image IMG1 with at least a portion of the towing vehicle image IMG2 to generate a composite image IMG3. The controller 10 is configured to analyse the towing vehicle image IMG2 to identify a periphery P1 of the towed vehicle V1. As shown in FIG. 4B, the periphery P1 represents the external visible boundary (or an outer edge) of the towed vehicle V1 from the view point of the towing vehicle camera C2. The controller 10 can identify the periphery P1 by calculating optical flow vectors of pixels between two or more frames of the towing vehicle image IMG2. A gradient of the magnitude of the optical flow vectors is calculated across the towing vehicle image IMG2. The gradient is largest at the periphery P1 of the towed vehicle V1 where pixels associated with a region of the towing vehicle image IMG2 relating to the towed vehicle V1 (and having a relatively low movement) are disposed proximal to or adjacent to pixels associated with a region of the towing vehicle image IMG2 relating to the background (and having a relatively high movement). Other techniques can be used to identify the periphery P1 of the towed vehicle V1. For example, the periphery P1 could be predefined or modelled based on stored geometric data defining the towed vehicle V1. As shown in FIG. 6A, a window W1 is defined within the identified periphery P1. The window W1 is rectangular in the present embodiment, but other shapes may be usefully employed. A subsection of the first image IMG1 is displayed in the window W1 to form the composite image IMG3, as shown in FIG. 6B.

Figure 3:
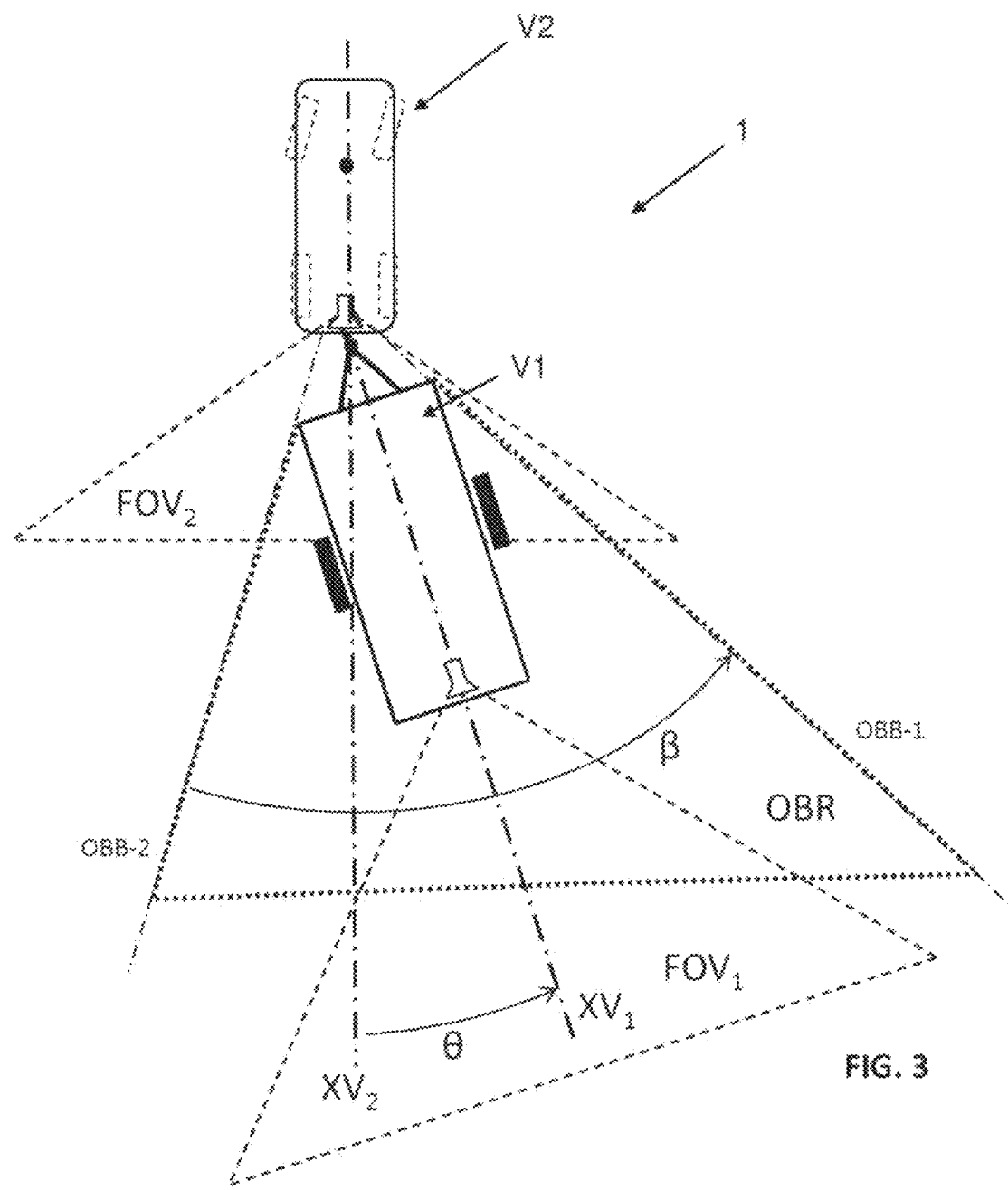
FIG. 3 shows a schematic representation of the towing vehicle and the towed vehicle in a first articulated configuration.

As outlined above, the towed vehicle V1 is captured in the towing vehicle image IMG2. The towed vehicle V1 obscures a region of the scene behind the towing vehicle V2 and impedes rear visibility. The region of the second field of view FOV2 which is obscured by the towed vehicle V1 is referred to herein as an obscuration region OBR. The obscuration region OBR is illustrated in FIG. 3. It will be understood that the size, profile and location of the obscuration region OBR is dependent on the location of the towing vehicle camera C2 and also the articulation angle θ. The obscuration region OBR comprises a first frustum OF-1. The first frustum is a three-dimensional body and comprises an obscuration region centreline OBRCL. The first frustum has a transverse cross-section (perpendicular to the obscuration region centreline OBRCL) which is approximated as being a rectangle in the present embodiment. The first frustum OF-1 may, for example, comprise a truncated cone or pyramid which expands outwardly away from the towing vehicle camera C2. The shape of the first frustum OF-1 can be estimated with reference to the profile of the towed vehicle V1 within the towing vehicle image IMG2. For example, the obscuration region OBR can be modelled with reference to the periphery P1 of the towing vehicle V1 extracted from the towing vehicle image IMG2. The obscuration region centreline OBRCL represents an axis extending from the towing vehicle camera V2 through a geometrical centre of the area bounded by the periphery P1.

Figure 7:
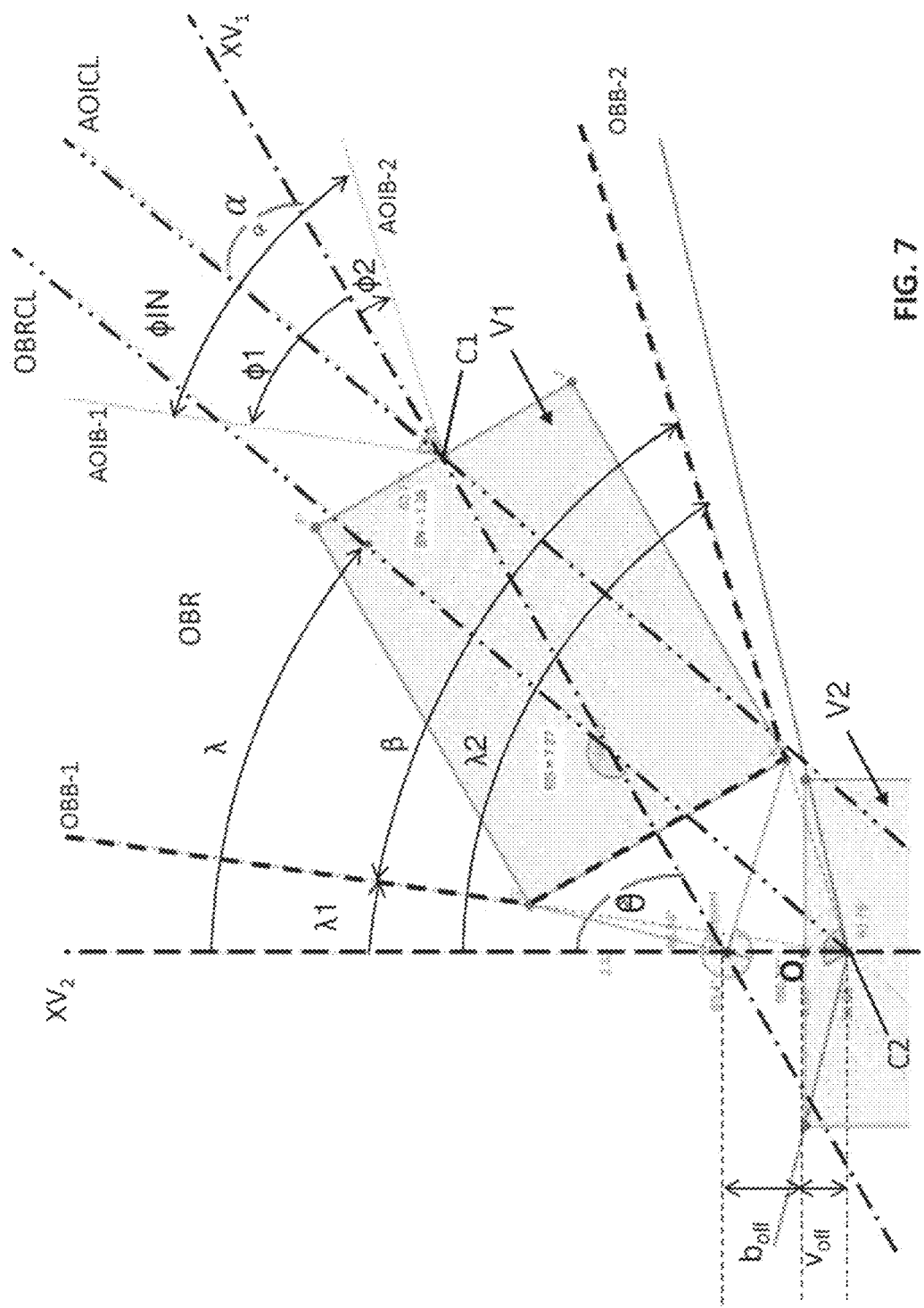
FIG. 7 illustrates the determination of an obscuration region within the image captured by the towing vehicle imaging device.

The controller 10 is configured to model the obscuration region OBR with reference to an origin O, as shown in FIG. 7. The obscuration region OBR may be modelled in two dimensions or in three dimensions. The controller 10 in the present embodiment is configured to model the obscuration region OBR in two-dimensions within a reference plane. The reference plane in the present embodiment is a horizontal plane (coincident with the plane of the drawing sheet in FIG. 7). The obscuration region OBR in this simplified model comprises a truncated triangle. In a variant, the controller 10 could model the obscuration region OBR in three-dimensions, for example as a truncated cone or pyramid. The controller 10 is configured to determine an angular extent and an angular orientation of the obscuration region OBR within the towing vehicle image IMG2. The controller 10 identifies first and second obscuration region lateral boundaries OBB-1, OBB-2 of the obscuration region OBR. The first and second obscuration region lateral boundaries OBB-1, OBB-2 represent the first and second limits of the obscuration region OBR in the towing vehicle image IMG2. In other words, the first and second obscuration region lateral boundaries OBB-1, OBB-2 correspond to the first and second sides of the towed vehicle V1 when viewed within the towing vehicle image IMG2. In the present embodiment, the angular position of the first and second obscuration region lateral boundaries OBB-1, OBB-2 are defined by respective first and second obscuration region angular coordinates $\lambda 1$, $\lambda 2$ (measured relative to the second longitudinal axis XV2 in a horizontal plane). An obscuration region internal angle $\beta$ (measured between the first and second obscuration region lateral boundaries OBB-1, OBB-2) defines an angular extent of the obscuration region OBR. The obscuration region centreline OBRCL bisects the obscuration region OBR. An obscuration region centreline angular coordinate $\lambda$ defines the orientation of the obscuration region centreline OBRCL in a horizontal plane relative to the second longitudinal axis VX2. In the present embodiment, the obscuration region centreline angular coordinate A defines the orientation of the obscuration region centreline OBRCL relative to the optical axis of the second imaging device C2. The obscuration region centreline angular coordinate A is determined by the equation:

$$\lambda = \lambda 1 + \left(\frac{\beta}{1}\right)$$

The relative position and origin of the towed vehicle camera C1 and the towing vehicle camera C2 are dependent on the orientation of the towed vehicle V1 and the towing vehicle V2 relative to each other. The controller 10 in present embodiment is configured to model the towed vehicle V1 and the towing vehicle V2 to determine the position and/or orientation of the towed vehicle camera C1 relative to the towing vehicle camera C2. The positions of the towed vehicle camera C1 and the towing vehicle camera C2 are determined in relation to an origin O. The location of the origin O is predefined and in the present embodiment is defined as a fixed point on the second longitudinal axis XV2 at a rear of the towing vehicle V2. The origin O could optionally be coincident with the towing vehicle camera C1. The controller 10 accesses a vehicle data set stored on the memory device 18. The vehicle data set may be predefined. The vehicle data set comprises:

1. A towing vehicle camera offset $v_{off}$ defining an offset of the towing vehicle camera C2 from the origin O along the second longitudinal axis XV2.
2. A tow ball offset born defining an offset of the tow ball 7 from the origin O along the second longitudinal axis XV2.
3. A coupling frame length $a_L$ defining a length of the coupling frame 6 along the first longitudinal axis XV1.
4. A towed vehicle width $t_W$ defining a width of the towed vehicle V1 measured perpendicular to the first longitudinal axis XV1.

The towing vehicle camera offset $v_{off}$ and the tow ball offset born may be defined for a particular towing vehicle V2. A user may, for example, select the particular towing vehicle V2 from a database comprising predefined parameters for a plurality of different types of towed vehicles V1. Alternatively, or in addition, the parameters for the particular towed vehicle V1 may be input by a user or downloaded from a server or a computational device. The dimensions of the towed vehicle V1 may be derived from other sources, for example through analysis of the dynamic behaviour of the towed vehicle V1 and/or using image process techniques to analyse the towing vehicle image IMG2.

The controller 10 models the obscuration region OBR in dependence on the vehicle data set and the measured articulation angle $\theta$. The controller 10 can, for example, model the first and second obscuration region lateral boundaries OBB-1, OBB-2 and the obscuration region centreline OBRCL. The controller 10 may thereby determine the first and second obscuration region angular coordinates $\lambda 1$, $\lambda 2$ and the obscuration region centreline angular coordinate A. Alternatively, or in addition, the obscuration region OBR and/or the first and second obscuration region lateral boundaries OBB-1, OBB-2 can be derived from processing of the towing vehicle image IMG2. For example, the first and second obscuration region lateral boundaries OBB-1, OBB-2 can be approximated in dependence on the periphery P1 extracted from the towing vehicle V2.

Figure 8:
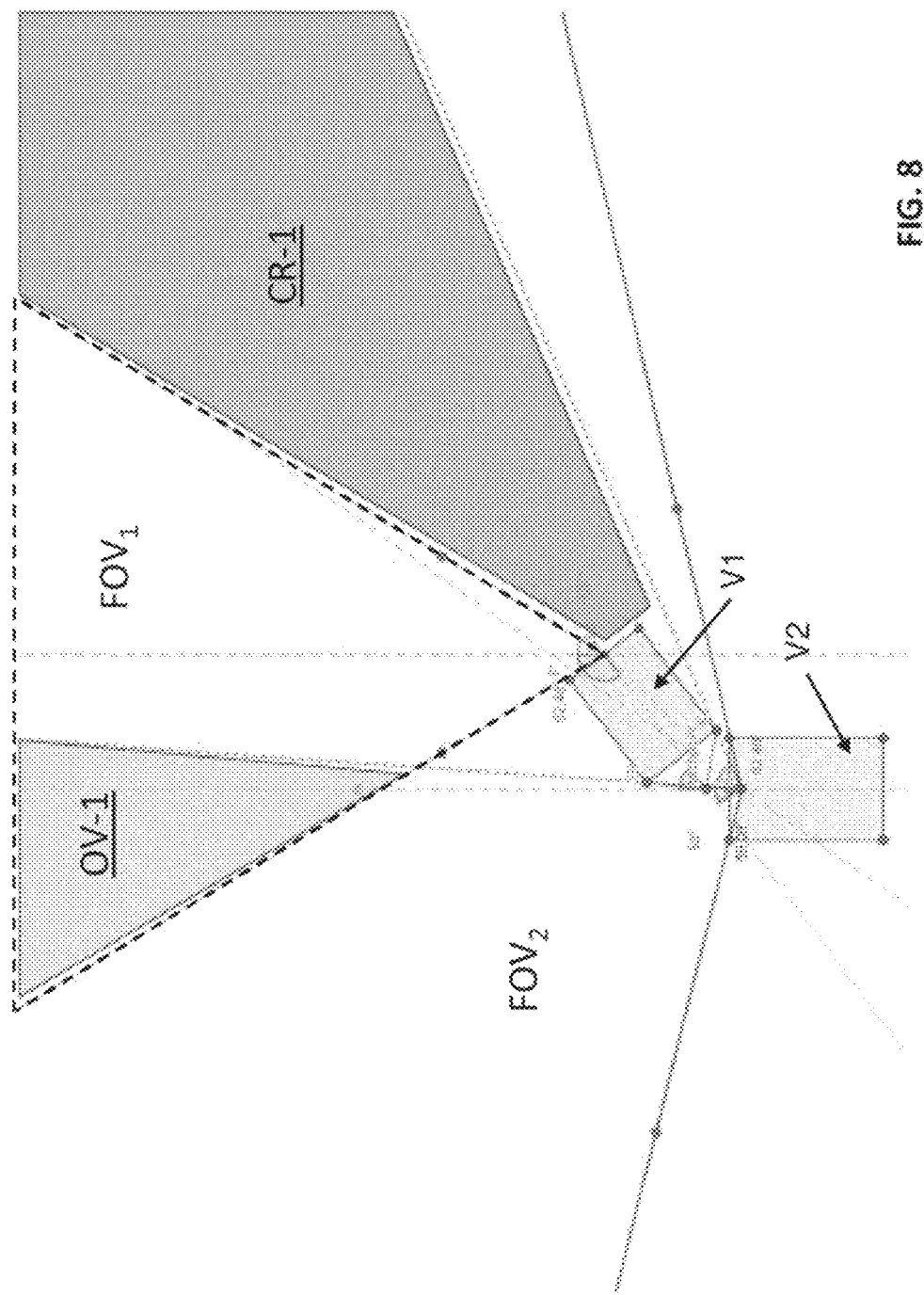
FIG. 8 illustrates formation of a concealed region and an overlapping region depending on the orientation of the towed vehicle camera and the towing vehicle camera.

Due to the longitudinal offset between the towed vehicle camera C1 and the towing vehicle camera C2, one or more concealed regions CR-n occur within the towed vehicle image IMG1 and the towing vehicle image IMG2. The formation of a concealed region CR-1 is illustrated in FIG. 8 in which the field of view FOV1 of the towed vehicle camera C1 is rotated such that the first optical axis extends parallel to the second longitudinal axis XV2. An object of interest which is situated in the concealed region CR-n may be hidden or obscured from sight in the towed vehicle image IMG1 and the towing vehicle image IMG2. As shown in FIG. 8, a first concealed region CR-1 is formed on a first side of the towed vehicle V1 distal from the towing vehicle camera C2. A second concealed region (not shown) may form on a second side of the towed vehicle V1 proximal to the towing vehicle camera C2. It will be appreciated that the size and extent of the or each concealed region(s) CR-n is dependent on the articulation angle $\theta$ of the towed vehicle V1. The formation of the concealed region(s) CR-n may prove problematic when the composite image IMG3 is formed. In particular, an object of interest located within the concealed region CR-1 may not be visible (or may be only partially visible) in either the towed vehicle image IMG1 or the towing vehicle image IMG2. In certain instances, the object of interest may not be visible in the resulting composite image IMG3.

The first and second fields of view FOV1, FOV2 may overlap each other, thereby forming one or more overlap region OV-n, as shown in FIG. 8. A first overlap region OV-1 may form on a first side of the towed vehicle V1. Alternatively, or in addition, a second overlap region (not shown) may form on a second side of the towed vehicle V1. It will be appreciated that the size and extent of the or each overlap region OV-n is dependent on the articulation angle $\theta$ of the towed vehicle V1. An object of interest which is situated in the overlap region OV-n may be present in both the towed vehicle image IMG1 and the towing vehicle image IMG2. The formation of an overlap region OV-n may prove problematic when the composite image IMG3 is formed. An object of interest located within the overlap region OV-n which is visible in both the towed vehicle image IMG1 and the towing vehicle image IMG2 may be duplicated when the towed vehicle image IMG1 and the towing vehicle image IMG2 are combined. In certain instances, the resulting composite image IMG3 may comprise duplicates of the object of interest.

The controller 10 is configured to address the above problems by determining an area of interest AOI from within the towed vehicle image IMG1. The area of interest AOI is a viewing region which is contained within the obscuration region OBR. A subsection of the first image data DIMG1 corresponding to the area of interest AOI can be selected and output. The area of interest AOI may be displayed independently, for example in a separate display window or on a separate display. In the present embodiment, the area of interest AOI is combined with the towing vehicle image IMG2 to form the composite image IMG3. The area of interest AOI is a subsection of the towed vehicle image IMG1 which is rendered as a semi-transparent image over the towing vehicle image IMG2 such that the features of the towed vehicle V1 present in the towing vehicle image IMG2 remain visible. The resulting composite image IMG3 can provide visual information which would otherwise be hidden or concealed from view by the presence of the towed vehicle V1 within the towing vehicle image IMG2. The selection of the area of interest AOI will now be described.

The area of interest AOI represents a portion of the first field of view FOV1 which is located entirely within the obscuration region OBR. The area of interest AOI is selected to reduce or minimise the size of each concealed region CR-n and/or the size of each overlap region OV-n. The area of interest AOI is bounded by the obscuration region OBR. In three-dimensions, the area of interest AOI would form frustum, for example comprising a truncated cone or pyramid, which expands outwardly away from the towed vehicle camera C1. In the present embodiment, the controller 10 models the area of interest AOI in two dimensions. As such, the area of interest AOI comprises a truncated triangle having sides which are bounded by the first and second obscuration region lateral boundaries OBB-1, OBB-2. The area of interest AOI has an area of interest centreline AOICL. The controller 10 is configured to determine an angular coordinate a of the area of interest centreline AOICL with respect to the first longitudinal axis XV1. The area of interest AOI has an internal angle φIN which represents a field of view of the area of interest AOI in a horizontal plane. The internal angle φIN of the area of interest AOI is less than the field of view FOV1 of the towed vehicle camera C1 in a horizontal plane. In a three-dimensional model, an incline angle of the area of interest centreline AOICL and a vertical angular extent could be determined to define the area of interest AOI as a three-dimensional frustum.

The angular coordinate a of the area of interest centreline AOICL defines an orientation of the area of interest centreline AOICL relative to the first longitudinal axis XV1. In the present embodiment, the area of interest AOI is modelled in two dimensions and the orientation of the area of interest centreline AOICL is defined only in the horizontal plane (XY plane). The area of interest centreline angular coordinate a is calculated dynamically in dependence on the articulation angle θ of the towed vehicle V1. The area of interest centreline angular coordinate a defines an effective rotation angle of the area of interest AOI about the optical axis of the towed vehicle camera C1. The area of interest centreline angular coordinate a is a positive variable (+ve) when rotated in an anti-clockwise direction and a negative variable (−ve) when rotated in a clockwise direction. The calculation of the area of interest centreline angular coordinate a and the internal angle φIN of the area of interest AOI will now be described.

The controller 10 accesses the vehicle data set stored in the memory device 18 and receives the articulation signal SART comprising the articulation angle θ. The area of interest centreline angular coordinate a is calculated using the following equation:

$$\alpha = \theta - \beta\lambda 1$$

Where

θ is the measured articulation angle;

β is the obscuration region internal angle; and

λ1 is the first obscuration region angular coordinate.

The first variable β is calculated using the following equation:

$$\beta = \cos^{-1}\left(\frac{A}{4\sqrt{BC}}\right)$$

Where:

$$A = 2a_L^2 - \frac{t_w^2}{2} + 2(b_{off} + v_{off})^2 + 4(b_{off} + v_{off})a_L \cos\theta$$

$$B = a_L^2 + \left(\frac{t_w}{2}\right)^2 + 2(b_{off} + v_{off})\left(a_L \cos\theta + \frac{t_w}{2}\sin\theta\right) + (b_{off} + v_{off})^2$$

$$C = a_L^2 + \left(\frac{t_w}{2}\right)^2 + 2(b_{off} + v_{off})\left(a_L \cos\theta - \frac{t_w}{2}\sin\theta\right) + (b_{off} + v_{off})^2$$

The second variable A is calculated using the following equation:

$$\lambda 1 = \tan^{-1}\left(\frac{a_L \sin\theta - \frac{t_w}{2}\cos\theta}{a_L \cos\theta + \frac{t_w}{2}\sin\theta + (b_{off} + v_{off})}\right)$$

Figure 9:
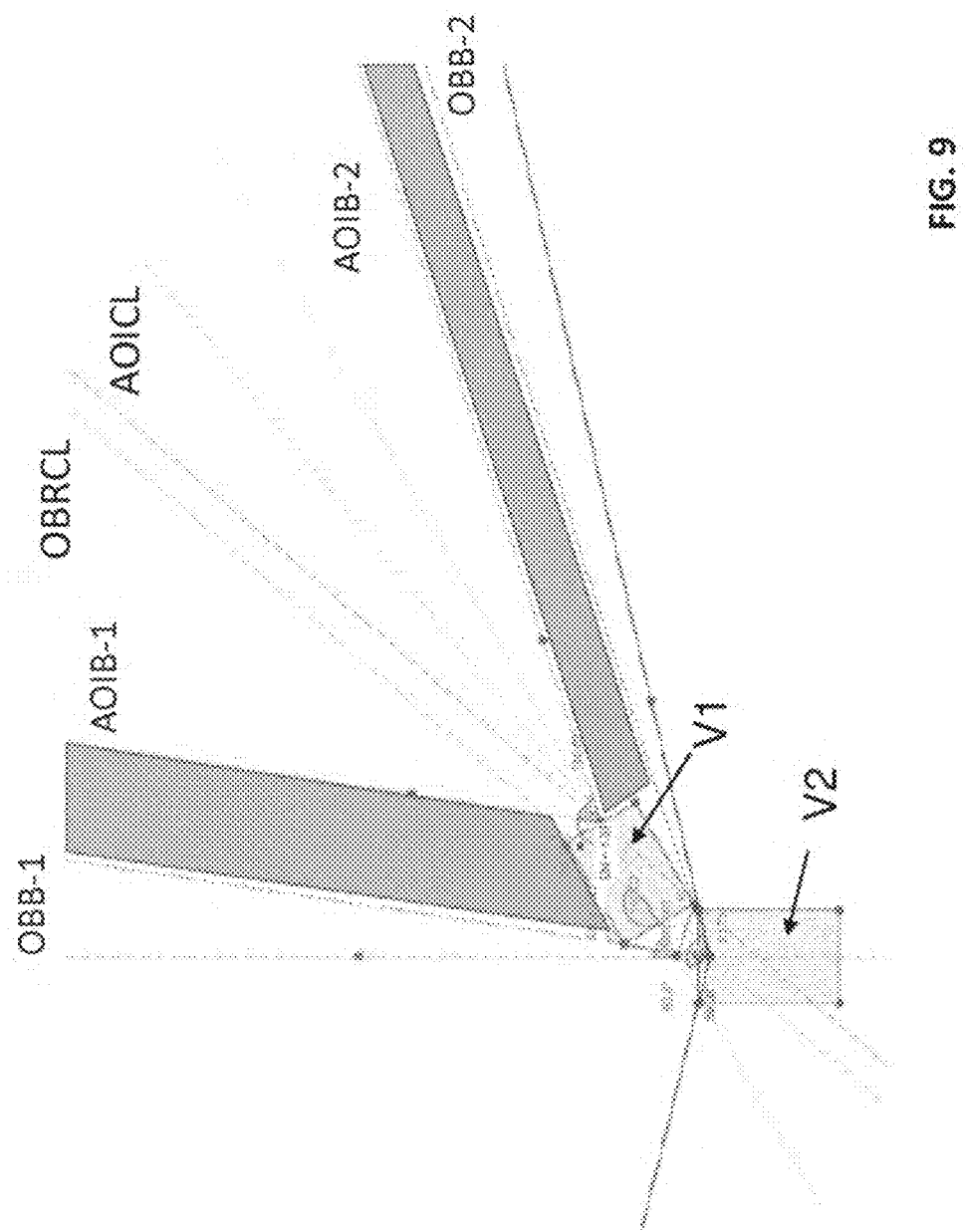
FIG. 9 illustrates the selection of an area of interest within the obscuration region to generate a composite image.

As shown in FIG. 9, the area of interest centreline angular coordinate a is calculated such that the area of interest centreline AOICL extends substantially parallel to the obscuration region centreline OBRCL. When the towed vehicle V1 and the towing vehicle V2 are aligned (i.e. the articulation angle θ is zero), the obscuration region centreline OBRL and the area of interest centrelines AOICL are substantially coincident with each other. When the towed vehicle V1 and the towing vehicle V2 are inclined at an angle relative to each other (i.e. the articulation angle θ is non-zero), the obscuration and area of interest centrelines OBRCL, AOICL are parallel to (and offset from) each other.

The controller 10 also determines the area of interest internal angle φIN representing the field of view of the area of interest AOI in a horizontal plane. The controller 10 may determine first and second area of interest angular coordinates φ1, φ2 defining the angular orientation of the first and second lateral boundaries AOIB-1, AOIB-2 of the area of interest AOI with respect to the first longitudinal axis XV1. In the present embodiment, the area of interest internal angle φIN is set substantially equal to the obscuration region internal angle β. The controller 10 selects a subsection of the first image data DIMG1 in dependence on the determined area of interest AOI. This selection procedure may comprise cropping a first side and/or a second side of the first image IMG3 corresponding to the determined area of interest AOI.

As illustrated in FIG. 9, the controller 10 selects the area of interest AOI so as to prevent the formation of (or to reduce the size of) any overlapping regions OV-n between the first and second field of views FOV1, FOV2. The area of interest AOI selected from within the first field of view FOV1 and is contained entirely within the obscuration region OBR of the second field of view FOV2. Accordingly, the risk of image elements being duplicated within the composite image IMG3 is reduced. Furthermore, the controller 10 selects the area of interest AOI to reduce or minimise the size of the concealed region(s) CR-n between the first and second field of views FOV1, FOV2. As shown in FIG. 9, the width of the or each concealed region CR-n is substantially constant. In a variant, the area of interest internal angle $\varphi$IN may be larger than the obscuration region internal angle $\beta$ such that the width of the one or more concealed regions CR-n decreases. The area of interest internal angle $\varphi$IN may, for example, be defined such that the width of the one or more concealed regions CR-n decreases to zero at a predefined location (for example at a predefined distance, such as infinity, from the origin O).

Figure 10:
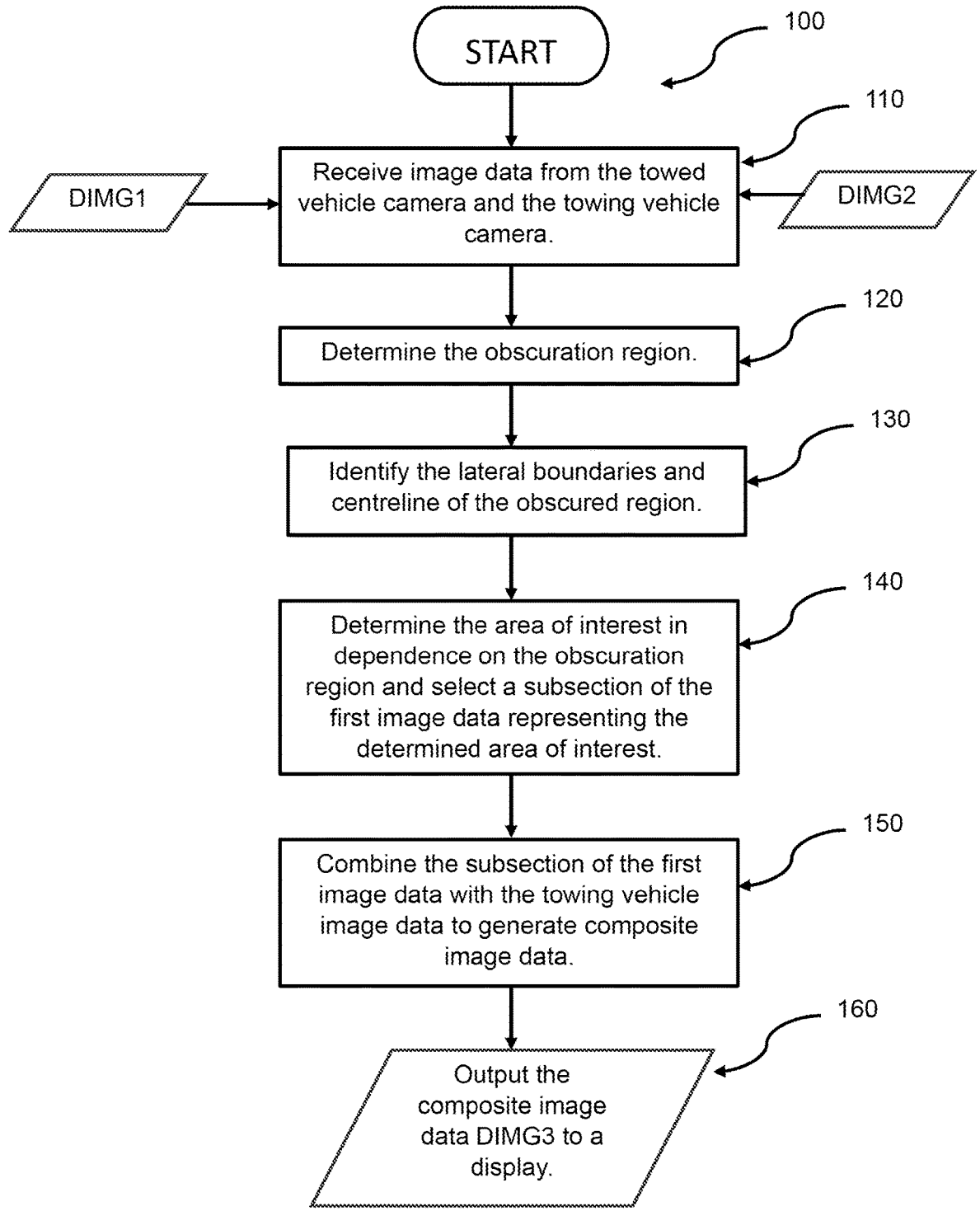
FIG. 10 shows a block diagram representing operation of the image processing system.

The operation of the image processing system 1 will now be described with reference to a flow diagram 100 shown in FIG. 10. The controller 10 receives the first and towing vehicle image data DIMG1, DIMG2 from the towed vehicle camera C1 and the towing vehicle camera C2 respectively (BLOCK 110). The controller 10 models the towed vehicle V1 and the towing vehicle V2 to determine the obscuration region OBR (BLOCK 120). The controller 10 identifies the lateral boundaries and the centreline of the obscuration region OBR (BLOCK 130). The controller 10 determines the area of interest AOI in dependence on the obscuration region OBR (BLOCK 140). A subsection of the first image data IMG1 representing the determined area of interest AOI is selected (BLOCK 140). The subsection of the first image data IMG1 is combined with the towing vehicle image data DIMG2 to generate composite image data DIMG3 (BLOCK 150). The composite image data DIMG3 is output to a display (BLOCK 160).

Example controllers 10 have been described comprising at least one electronic processor 12 configured to execute electronic instructions stored within at least one memory device 18, which when executed causes the electronic processor(s) 12 to carry out the method as herein described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

The embodiment of the present invention described herein comprises first and towing vehicle imaging devices C1, C2. It will be understood that aspects of the present invention may be incorporated into systems comprising more than two imaging devices C1, C2. Although the first and towing vehicle imaging devices C1, C2 have been described as being disposed on separate vehicles V1, V2, it will be understood that the first and towing vehicle imaging devices C1, C2 could be disposed on the same vehicle V1, V2.

The imaging devices C1, C2 described herein each comprise a digital camera. The cameras may be optical cameras, for example operating in the visible or non-visible light spectrum. Alternatively, or in addition, the imaging devices C1, C2 may comprise other types of sensors. For example, the imaging devices C1, C2 may comprise one or more of the following: an ultrasonic sensor, a lidar sensor and a radar sensor.

The controller 10 is described herein as generating a composite image IMG3 composed of at least a portion of each of the towed vehicle image IMG1 and the towing vehicle image IMG2. In a variant, the subsection AOI selected from within the towed vehicle image IMG1 could be displayed independently. For example, the area of interest AOI could be displayed in a separate viewing window or on a separate display.

It will be appreciated that various changes and modifications can be made to the present invention without departing from the scope of the present application.

In a variant, the articulation angle $\theta$ could be determined by processing the towed vehicle image IMG1 to determine the relative orientation of the towed vehicle V1. The controller 10 could, for example, process the towing vehicle image IMG2 to determine a relative position and/or size of one or more targets (not shown) provided on a front face of the towed vehicle V1.

Aspects of the invention are laid out in the following numbered clauses:

1. An image processing system for processing image data received from first and second imaging devices provided on a towing vehicle and a towed vehicle, the towing vehicle and the towed vehicle being connected to each other by an articulated coupling, the image processing system comprising one or more controller, the image processing system comprising:
   an input configured to receive:
      first image data from a first imaging device disposed on the towed vehicle and having a first field of view, the first image data representing a first scene behind the towed vehicle;
      second image data from a second imaging device disposed on the towing vehicle and having a second field of view, the second image data representing a second scene behind the towing vehicle;
   a processor configured to:
      determine an obscuration region in the second field of view which is obscured by the towed vehicle;
      determine an area of interest in the first field of view in dependence on the determined obscuration region; and
   select a subsection of the first image data representing at least a portion of the determined area of interest.

2. An image processing system according to clause 1, wherein the processor is configured to determine the area of interest to be contained within the obscuration region.

3. An image processing system according to clause 1 or clause 2, wherein the processor is configured to:
   identify one or more lateral boundary of the area of interest and/or one or more lateral boundary of the obscuration region.

4. An image processing system according to clause 3, wherein the processor is configured to determine the area of interest such that the or each area of interest lateral boundary extends substantially parallel to or is substantially coincident with a corresponding one of the at least one obscuration region lateral boundary.

5. An image processing system according to clause 3, wherein the processor is configured to determine the area of interest such that the or each area of interest lateral boundary converges towards a corresponding one of the at least one obscuration region lateral boundary at a predetermined distance.

6. An image processing system according to any one of the preceding clauses, wherein the processor is configured to:
   determine an internal angle of the obscuration region; and
   determine the area of interest such that an internal angle of the area of interest is at least substantially equal to the obscuration region internal angle.

7. An image processing system according to any one of the preceding clauses, wherein the obscuration region has an obscuration region centreline and the area of interest has an area of interest centreline; the processor being configured to determine the area of interest such that the area of interest centreline is substantially parallel to the obscuration region centreline.

8. An image processing system according to any one of the preceding clauses, wherein the input is configured to receive an articulation angle signal indicating an articulation angle between the towed vehicle and the towing vehicle; and the processor is configured to determine the obscuration region in dependence on the articulation angle.

9. An image processing system according to any one of the preceding clauses, wherein the processor is configured to access a vehicle data file comprising one or more of the following: a trailer width; a trailer length; a coupling offset; a tow coupling offset.

10. An image processing system according to any one of the preceding clauses, wherein the input is configured to receive an articulation angle indicating a current angular orientation of the towed vehicle relative to the towing vehicle; the processor being configured to determine the obscuration region in dependence on the articulation angle.

11. An image processing system according to any one of the preceding clauses, wherein the processor is configured to process the second image data to determine at least a portion of an outline of the towed vehicle within the first scene to determine the obscuration region.

12. A vehicle comprising an image processing system according to any one of the preceding clauses.

13. An image processing method for a towing vehicle coupled to a towed vehicle by an articulated coupling, the image processing method comprising:
   receiving first image data from a first imaging device disposed on the towed vehicle and having a first field of view, the first image data representing a first scene behind the towed vehicle;
   receiving second image data from a second imaging device disposed on the towing vehicle and having a second field of view, the second image data representing a second scene behind the towing vehicle;
   determining an obscuration region in the second field of view which is obscured by the towed vehicle;
   determining an area of interest in the first field of view in dependence on the determined obscuration region; and
   selecting a subsection of the first image data representing at least a portion of the determined area of interest.

14. An image processing method according to clause 13, wherein the area of interest is contained within the obscuration region.

15. An image processing method according to clause 13 or clause 14, wherein the method comprises:
   identifying one or more lateral boundary of the area of interest and/or one or more lateral boundary of the obscuration region.

16. An image processing method according to clause 15, wherein the method comprises:
   determining the area of interest such that the or each area of interest lateral boundary extends substantially parallel to or is substantially coincident with a corresponding one of the at least one obscuration region lateral boundary.

17. An image processing method according to clause 15, wherein the method comprises:
   determining the area of interest such that the or each area of interest lateral boundary converges towards a corresponding one of the at least one obscuration region lateral boundary at a predetermined distance.

18. An image processing method according to any one of clauses 13 to 17, wherein the method comprises:
   determining an internal angle of the obscuration region; and
   determining the area of interest such that an internal angle of the area of interest is at least substantially equal to the obscuration region internal angle.

19. An image processing method according to any one of clauses 13 to 18, wherein the method comprises:
   identifying a centreline of the obscuration region; and
   determining the area of interest such that a centreline of the area of interest is substantially parallel to the obscuration region centreline.

20. An image processing method according to any one of clauses 13 to 19, wherein the method comprises determining an articulation angle of the towed vehicle relative to the towing vehicle; and determining the obscuration region in dependence on the articulation angle.

21. An image processing method according to any one of clauses 13 to 20, wherein the method comprises processing the second image data to determine at least a portion of an outline of the towed vehicle within the first scene to determine the obscuration region.

22. Computer software that, when executed, is arranged to perform a method according to any one of clauses 13 to 21.

23. A non-transitory, computer-readable storage medium storing instructions thereon that, when executed by one or more electronic processors, causes the one or more electronic processors to carry out the method of any one of clauses 13 to 21.

The invention claimed is:

1. An image processing system for processing image data received from first and second imaging devices provided on a towing vehicle and a towed vehicle, the towing vehicle and the towed vehicle being connected to each other by an articulated coupling, the image processing system comprising one or more controller, the image processing system comprising:
   an input configured to receive:
      first image data from a first imaging device disposed on the towed vehicle and having a first field of view, the first image data representing a first scene behind the towed vehicle;
      second image data from a second imaging device disposed on the towing vehicle and having a second field of view, the second image data representing a second scene behind the towing vehicle;
   a processor configured to:
      determine an obscuration region in the second field of view which is obscured by the towed vehicle, identify one or more lateral boundary of the obscuration region and determine an angular coordinate of the or each lateral boundary of the obscuration region;
      determine an area of interest in the first field of view in dependence on the determined obscuration region, the area of interest being contained within the obscuration region; and select a subsection of the first image data representing at least a portion of the determined area of interest; and an output configured to output the selected subsection of the first image data.

2. An image processing system as claimed in claim 1, wherein the processor is configured to model the obscuration region with reference to a reference point, the obscuration region being modelled in a reference plane which is a horizontal plane.

3. An image processing system as claimed in claim 1, wherein the processor is configured to:

identify one or more lateral boundary of the area of interest.

4. An image processing system as claimed in claim 3, wherein the processor is configured to determine the area of interest such that the or each area of interest lateral boundary extends substantially parallel to or is substantially coincident with a corresponding one of the at least one obscuration region lateral boundary.

5. An image processing system as claimed in claim 3, wherein the processor is configured to determine the area of interest such that the or each area of interest lateral boundary converges towards a corresponding one of the at least one obscuration region lateral boundary at a predetermined distance.

6. An image processing system as claimed in claim 1, wherein the processor is configured to:

determine an internal angle of the obscuration region; and
determine the area of interest such that an internal angle of the area of interest is at least substantially equal to the obscuration region internal angle.

7. An image processing system as claimed in claim 1, wherein the obscuration region has an obscuration region centreline and the area of interest has an area of interest centreline; the processor being configured to determine the area of interest such that the area of interest centreline is substantially parallel to the obscuration region centreline.

8. An image processing system as claimed in claim 1, wherein the input is configured to receive an articulation angle signal indicating an articulation angle between the towed vehicle and the towing vehicle; and the processor is configured to determine the obscuration region in dependence on the articulation angle.

9. An image processing system as claimed in claim 1, wherein the processor is configured to access a vehicle data file comprising one or more of the following: a trailer width; a trailer length; a coupling offset; a tow coupling offset.

10. An image processing system as claimed in claim 1, wherein the input is configured to receive an articulation angle indicating a current angular orientation of the towed vehicle relative to the towing vehicle; the processor being configured to determine the obscuration region in dependence on the articulation angle.

11. An image processing system as claimed in claim 1, wherein the processor is configured to process the second image data to determine at least a portion of an outline of the towed vehicle within the first scene to determine the obscuration region.

12. A vehicle comprising the image processing system as claimed in claim 1.

13. An image processing method for a towing vehicle coupled to a towed vehicle by an articulated coupling, the image processing method comprising:

receiving first image data from a first imaging device disposed on the towed vehicle and having a first field of view, the first image data representing a first scene behind the towed vehicle;

receiving second image data from a second imaging device disposed on the towing vehicle and having a second field of view, the second image data representing a second scene behind the towing vehicle;

determining an obscuration region in the second field of view which is obscured by the towed vehicle, identifying one or more lateral boundary of the obscuration region and determining an angular coordinate of the or each lateral boundary of the obscuration region;

determining an area of interest in the first field of view in dependence on the determined obscuration region, the area of interest being contained within the obscuration region; and selecting a subsection of the first image data representing at least a portion of the determined area of interest; and outputting the selected subsection of the first image data.

14. A non-transitory, computer-readable storage medium storing instructions thereon that, when executed by one or more electronic processors, causes the one or more electronic processors to carry out the method of claim 13.

15. An image processing system as claimed in claim 1, wherein the processor is configured to determine an angular extent and an angular orientation of the obscuration region.

* * * * *